United States Patent
Mori et al.

(10) Patent No.: US 7,984,144 B2
(45) Date of Patent: Jul. 19, 2011

(54) COMPUTER SYSTEM AND A METHOD FOR MANAGING LOGICAL VOLUMES

(75) Inventors: Yoshito Mori, Yokohama (JP); Manabu Obana, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 12/253,479

(22) Filed: Oct. 17, 2008

(65) Prior Publication Data
US 2010/0049845 A1   Feb. 25, 2010

(30) Foreign Application Priority Data
Aug. 22, 2008   (JP) ................................ 2008-213704

(51) Int. Cl.
G06F 15/173   (2006.01)
(52) U.S. Cl. ...................................... 709/224; 709/223
(58) Field of Classification Search .................. 709/223, 709/224
See application file for complete search history.

(56) References Cited

U.S. PATENT DOCUMENTS

| | | | | |
|---|---|---|---|---|
| 5,546,557 | A * | 8/1996 | Allen et al. ................... | 711/111 |
| 6,247,096 | B1 * | 6/2001 | Fisher et al. .................. | 711/114 |
| 2004/0107422 | A1 * | 6/2004 | Cabrera et al. ................ | 719/310 |
| 2005/0193023 | A1 * | 9/2005 | Ismail ........................... | 707/200 |
| 2006/0010289 | A1 * | 1/2006 | Takeuchi et al. ............... | 711/114 |
| 2006/0053250 | A1 | 3/2006 | Saze | |
| 2007/0168495 | A1 * | 7/2007 | Rothstein et al. ............. | 709/224 |
| 2007/0245114 | A1 | 10/2007 | Kakui et al. | |
| 2008/0144142 | A1 * | 6/2008 | Reece ........................... | 358/520 |
| 2010/0057913 | A1 * | 3/2010 | DeHaan ........................ | 709/226 |
| 2010/0115586 | A1 * | 5/2010 | Raghavan et al. ............. | 726/3 |

FOREIGN PATENT DOCUMENTS

| | | |
|---|---|---|
| JP | 04-216145 | 8/1992 |
| JP | 2006-72789 | 3/2006 |
| JP | 2006-235698 | 9/2006 |
| JP | 2006-350419 | 12/2006 |

OTHER PUBLICATIONS

Japanese Decision of Rejection in Japanese Patent Application 2008-213704, dated Oct. 5, 2010.
Office Action in Japanese Application No. 2008-213704, mailed Jul. 6, 2010 (with partial English translation).

* cited by examiner

*Primary Examiner* — Mohamed Wasel
(74) *Attorney, Agent, or Firm* — Brundidge & Stanger, P.C.

(57) ABSTRACT

A computer system manages logical volumes as operation map including a volume ID of the logical volume and a plurality of pieces of a predetermined operating information (for example, a path setting, main-volume, sub-volume, permanent storage setting, and storage period setting), when an operation is added to the logical volume, corresponding operating information is set to addition and when the operation is released, the information is set to release, and at a time when a predetermined operating information is all set to release, a corresponding logical volume to the volume ID is detected as being deletable, thereby detecting the deletable the logical volume automatically.

16 Claims, 16 Drawing Sheets

FIG.4

1210 VOLUME INFORMATION

| | 1211 | 1212 | 1213 | 1214 | 1215 | 1216 | 1217 | 1218 | 121X | 121Y | 1219 |
|---|---|---|---|---|---|---|---|---|---|---|---|
| | VOLUME ID | PATH | COPY-TYPE-1 | TARGET-1 | COPY-TYPE-2 | TARGET-2 | PER-MANENT VOLUME | VOLUME PERIOD | TRANSFER RATE | CAPACITY | FINAL ACCESS |
| 121a | Vol-1 | 1 | SECONDARY-VOLUME | Vol-30 | NONE | NONE | 0 | NONE | 4Gbps | 100GB | 2008/01/01 10:10:22 |
| 121b | Vol-2 | 1 | PRIMARY-VOLUME | Vol-40 | NONE | NONE | 1 | NONE | 2Gbps | 20GB | 2006/01/10 04:05:21 |
| 121c | Vol-3 | 1 | PRIMARY-VOLUME | Vol-50 | NONE | NONE | 0 | 10 DAYS | 2Gbps | 2TB | 2007/08/31 20:08:04 |
| 121d | Vol-4 | 0 | NONE | NONE | NONE | NONE | 0 | NONE | 4Gbps | 200MB | NONE |
| 121e | Vol-5 | 1 | PRIMARY-VOLUME | Vol-20 | SECONDARY-VOLUME | Vol-10 | 0 | NONE | 1Gbps | 50GB | 2006/04/01 15:32:41 |
| 121f | Vol-6 | 0 | NONE | NONE | NONE | NONE | 0 | NONE | 8Gbps | 1TB | NONE |
| 121g | Vol-7 | 1 | NONE | NONE | NONE | NONE | 0 | NONE | 100Mbps | 30GB | 2006/06/12 15:13:21 |
| | ... | ... | ... | ... | ... | ... | ... | ... | ... | ... | ... |

FIG.5

1120 OPERATING INFORMATION

| 112A VOLUME ID | 112B OPERATION ID | 112C OPERATION CLASSIFICATION |
|---|---|---|
| Vol-1 | PATH | ADDITION |

FIG.6

1220 OPERATION MAP

| | 1221 VOLUME ID | 1222 PATH | 1223 PRIMARY-VOLUME | 1224 SECONDARY-VOLUME | 1225 PERMANENT VOLUME | 1226 VOLUME PERIOD |
|---|---|---|---|---|---|---|
| 122a | Vol-1 | 1 | 2 | 0 | 0 | 0 |
| 122b | Vol-2 | 1 | 1 | 2 | 1 | 0 |
| 122c | Vol-3 | 1 | 1 | 2 | 0 | 1 |
| 122d | Vol-5 | 1 | 1 | 1 | 2 | 0 |
| 122e | Vol-6 | 2 | 2 | 0 | 0 | 2 |
| 122f | Vol-7 | 1 | 0 | 2 | 0 | 2 |
| | ⋮ | ⋮ | ⋮ | ⋮ | ⋮ | ⋮ |

FIG.7

1230 DELETABLE VOLUME LIST

| | VOLUME ID (1231) | PRIORITY RULE (1232) |
|---|---|---|
| 123a | Vol-4 | PAIR |
| 123b | Vol-6 | TRANSFER RATE |
| 123c | Vol-7 | NONE |

FIG.8

1240 DELETION-PRIORITY SETTING INFORMATION

| | PRIORITY RULE (1241) | DISCRIMINATION ORDER (1242) |
|---|---|---|
| 124a | PAIR | 1 |
| 124b | TRANSFER RATE | 4 |
| 124c | CAPACITY | 3 |
| 124d | FINAL ACCESS | 2 |

FIG.18

| FLAG | STATE | MEANING |
|---|---|---|
| 0 | UNSETTING | STATE INDICATES THAT OPERATIONS IN FIG. 3 ARE NOT SET |
| 1 | SETTING | STATE INDICATES THAT OPERATIONS IN FIG. 3 ARE SET |
| 2 | RELEASE | STATE INDICATES THAT OPERATIONS HAVING BEEN SET ARE RELEASED |

COMPUTER SYSTEM AND A METHOD FOR MANAGING LOGICAL VOLUMES

INCORPORATION BY REFERENCE

The present application claims priority from Japanese application JP2008-213704 filed on Aug. 22, 2008, the content of which is hereby incorporated by reference into this application.

BACKGROUND OF THE INVENTION

The present invention relates to a computer system including a management server and storage units, and in particularly to a technique for effectively using logical volumes in the storage units.

In these years, information amount to be handled by clients or users who utilize the storage units has been increased continuously, and this trend will continue certainly even in the future. The number of storage volumes in the user environment is also increased with the increase of information amount, it is therefore necessary to prepare a more effective volume management than that being presently used. Particularly for use in the operation, the reuse of volumes, which become unused, has been a serious problem for a manager who manages the storage units. In this relation, US2007/0245114 has disclosed a technique for discriminating whether an actual volume can be deleted in response to the presence or absence of access to the actual volume from a virtual volume.

SUMMARY OF THE INVENTION

In the case of a volume management system in the current computer system, whether a deletion of the volumes is carried out has been discriminated without considering operating conditions for the volumes, containing such as a copy-pair setting of a main-volume and a sub-volume, a path setting, etc. For this reason, it is necessary to confirm all of the operating conditions for the volumes by the manager, for a purpose of acquiring a final decision of whether the deletion can actually be carried out.

The present invention attempts to solve the above problem. To this end, an object of the invention is to provide a computer system and a method for managing logical volumes capable of detecting deletable logical volumes automatically, by managing the operating conditions for the logical volumes.

In order to achieve the foregoing object, the invention provides to manage all of the operating conditions operated by the manager, including the copy-pair setting for every logical volume, the path setting, etc. that are set in the logical volumes, and to discriminate that the logical volumes indicating that all of the operating conditions are a release state are set to deletable volumes, among the logical volumes which are added with the operation once.

According to the invention, the logical volumes which become deletable in the storage unit can be detected automatically.

The other objects, features and advantages of the invention will become apparent from the following description of the embodiments of the invention taken in conjunction with the accompanying drawings.

BRIEF DESCRIPTION OF THE DRAWINGS

FIG. 4 is an explanatory diagram showing volume information;

FIG. 5 is an explanatory diagram snowing operating information;

FIG. 6 is an explanatory diagram showing an operation map;

FIG. 7 is an explanatory diagram showing a deletion list;

FIG. 8 is an explanatory diagram showing deletion-priority setting information;

FIG. 18 is an explanatory diagram showing a relationship between operating conditions for the logical volume and flags.

DESCRIPTION OF THE EMBODIMENT

Hereinafter, embodiments of the invention will be described with reference to the drawings.

Figure 1:
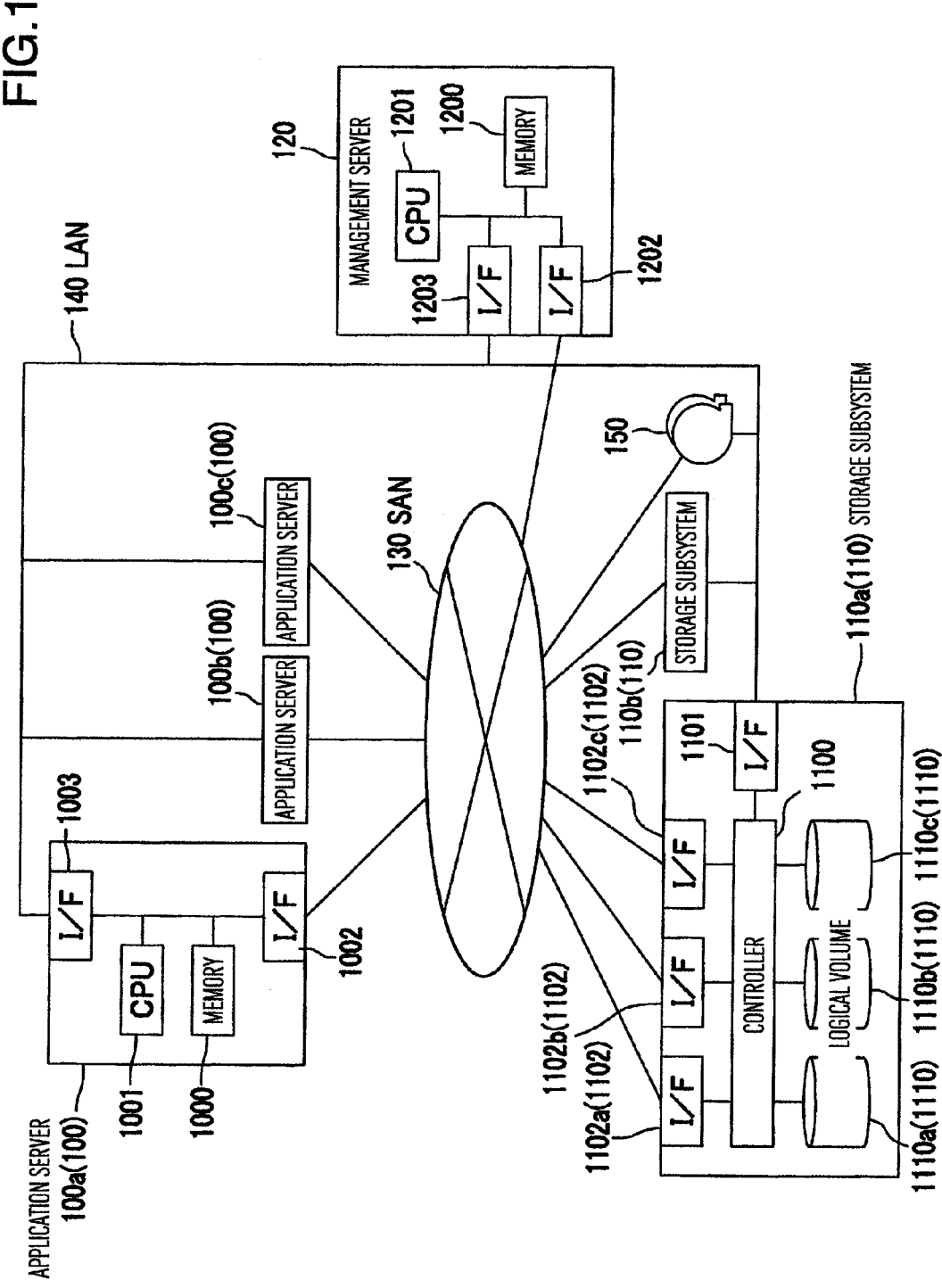
FIG. 1 is an overall constitutional diagram showing a computer system in an embodiment.

FIG. 1 is an overall constitutional diagram showing a computer system in an embodiment. The computer system provides with a business server (host) 100, or an application server, a storage unit, or a storage subsystem 110, and management server (management server unit) 120, and a tape unit 150 to be used for storing data. The business server 100, management server 120, storage unit 110 and tape unit 150 are coupled via a SAN (Storage Area Network) 130. Further, the business server 100, management server 120, storage unit 110 and tape unit 150, are coupled via LSN (Local Area Network) 140 or WAN (Wide Area Network).

Number of business server 100, storage unit 110 and tape unit 150 may be single or plural units. In FIG. 1, the business server 100 shows an example of containing business servers 100a, 100b and 100c. The storage unit 110 also shows an example of containing storage units 110a, 110b.

The business server 100 uses logical volumes 1110 in the storage unit 110, and also includes a memory 1000, a CPU (Central Processing Unit) 1001 for executing computer programs stored in the memory 1000, an I/F (Interface) 1002 for an access to the SAN 130, and an I/F 1003 for an access to the LAN 140.

The management server 120 manages operating conditions of the business server 100 and storage unit 110, and includes a memory (memory unit) 1200, a CPU 1201 for executing computer programs stored in the memory 1200, an I/F 1202 for access to the SAN 130, and an I/F 1203 access to the LAN 140.

The storage unit 110 stores information by the business server 100, and includes an I/F 1101 for access to the LAN 140, a plurality of I/Fs 1102 for access to the SAN 130, a plurality of logical volumes 1110 for storing information by the business server 100, and a controller 1100 for controlling the I/F 1101, I/F 1102 and logical volumes 1110. In addition, the logical volume 1110 is constituted by logical volumes 1110a, 1110b and 1110c. Further, the I/F 1102 is constituted by I/Fs 1102a, 1102b and 1102c.

Specifically, the I/Fs 1003, 1101 and 1203 are NIC (Network Interface Card). I/Fs 1002 and 1202 are HBA (Host Bus Adapter), and IF 1102 is CHA (Channel Adapter).

Figure 2:
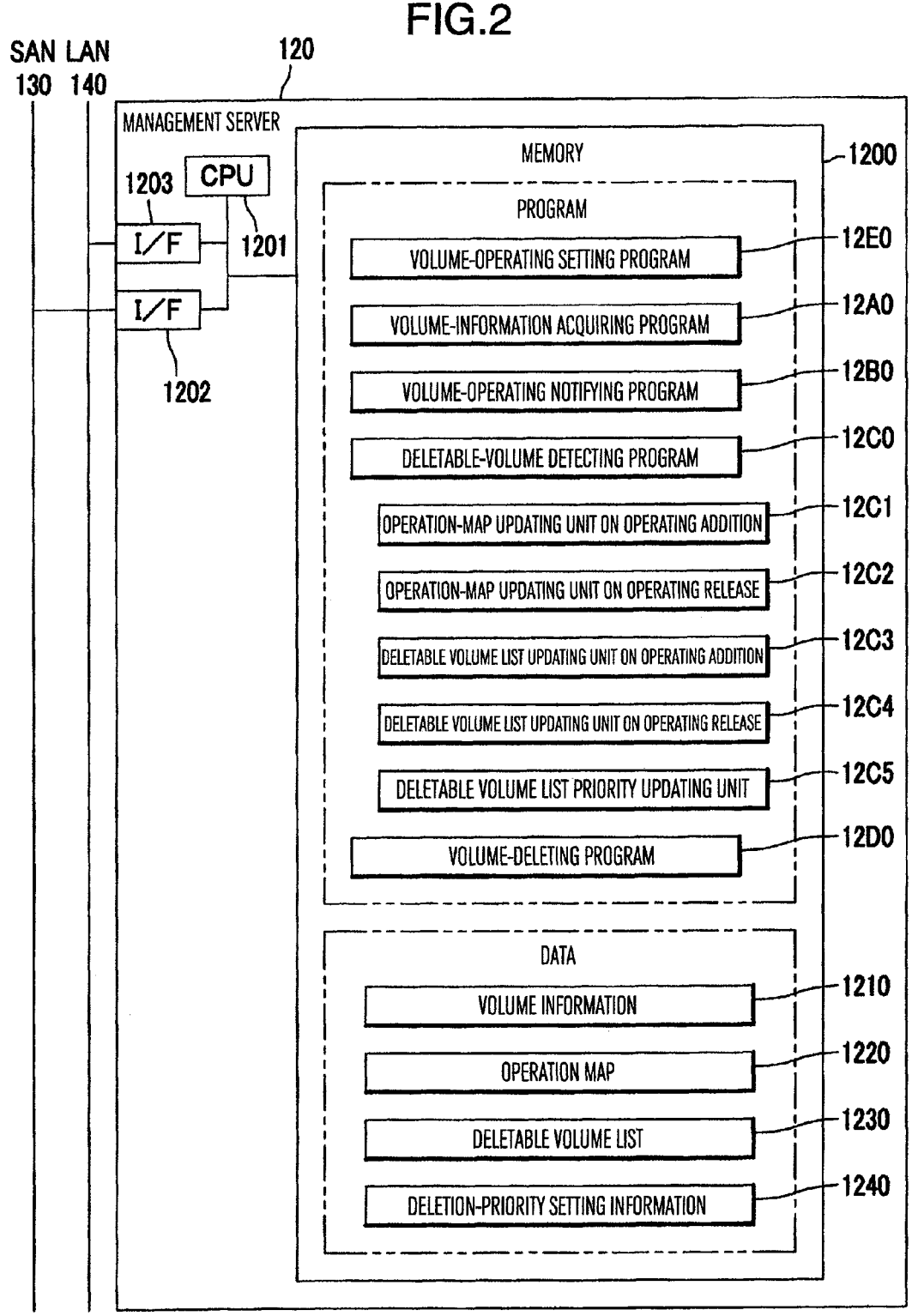
FIG. 2 is a block diagram showing a constitution of management server.

FIG. 2 is a block diagram showing a constitution of the management server 120. The memory 1200 in the management server 120 stores temporary data and various computer programs to be executed in the management server 120. The computer programs include a volume-operating setting program 12E0 to set an operation for the logical volume, a volume-information acquiring program (volume information acquiring unit) 12A0 to acquire information of the logical volumes from the storage unit 110, a volume-operating notifying program (volume-operating notifying unit) 12B0 to discriminate and notify that an operating condition for the logical volume is changed from volume information 1210 received from the volume-information acquiring program 12A0, a deletable-volume detecting program (deletable-volume detecting unit) 12C0 to detect a deletable volume among the logical volumes from operating information for the logical volumes, and a volume-deleting program 12D0 to execute a volume deleting process on the basis of deletable volume information received from the deletable-volume detecting program 12C0.

The deletable-volume detecting program 12C0 includes an operation-map updating unit 12C1 on an operating addition for the logical volumes 1110, an operation-map updating unit 12C2 on an operating release, a deletion-list updating unit 12C3 on the operating addition, a deletion-list updating unit 12C4 on the operating release, and a deletion-list priority updating unit 12C5.

The operation-map updating unit 12C1 on the operating addition updates the operating condition of the logical volume held in an operation map 1220 on the operating addition, to a setting state (referring to FIG. 18, corresponding to 1 in a flag) in relation to the logical volumes 1110. The operation-map updating unit 12C2 on the operating release updates the operating condition of the logical volume held in the operation map 1220 to a release state (referring to FIG. 18, corresponding to 2 in the flag) when the operating addition to the logical volumes 1110 is released.

The deletion-list updating unit 12C3 on the operating addition deletes the volume from a deletion list, or a deletable volume list 1230 in relation to the logical volumes 1110 when the volume is registered in the deletion list 1230 on the operating addition. The deletion-list updating unit 12C4 on the operating release registers the volume in the deletion list 1230 when the operation having been set in the logical volumes 1110 is all released. The deletion-list priority updating unit 12C5 updates a deletion priority order of the logical volumes in consistency with update contents of deletion-priority setting information 1240.

The data includes the volume information 1210 (referring to FIG. 4), the operation map 1220 (referring to FIG. 6), the deletion list 1230 (referring to FIG. 7), and the deletion-priority setting information 1240 (referring to FIG. 8). The volume information 1210 is a table for storing the volume information acquired from the storage unit 110 by the volume-information acquiring program 12A0. The operation map 1220 is a table for storing states of the operating addition and the release in relation to the logical volumes 1110, acquired from information set in the volume information 1210 by the deletable-volume detecting program 12C0.

The deletion list 1230 stores a list of the logical volumes 1110 discriminated as being deletable by the deletable-volume detecting program 12C0, and is sent to the volume-deleting program 12D0. A registration order of the logical volumes 1110 in the deletion list 1230 has its own meaning, that is, a priority order for the deletion is regarded as an ascending order in which the volumes are registered, in this embodiment. Further, a rule in which a priority is determined with information in pairs to discriminate the logical volumes 1110 is registered in the deletion list 1230.

The deletion-priority setting information 1240 includes a plurality of rules for determining the registration order of the volume in the deletion list 1230 and information for determining which the rule is more prioritized.

Figure 3:
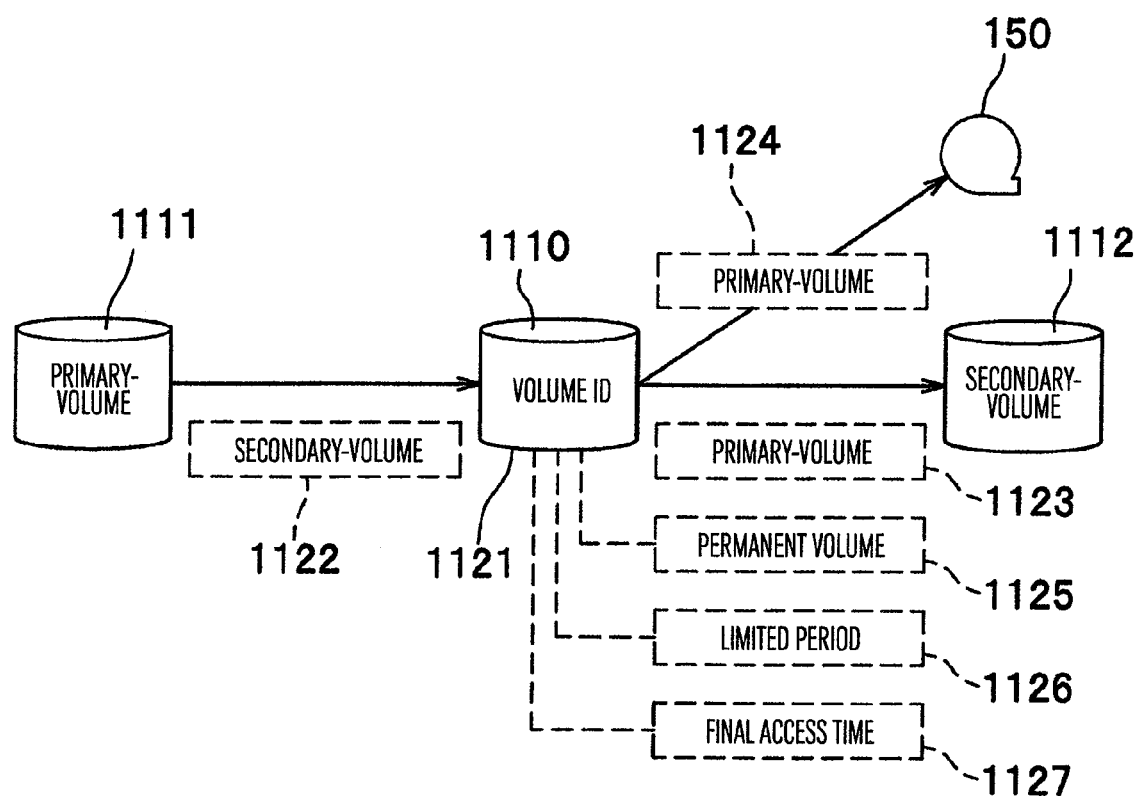
FIG. 3 is an explanatory diagram showing an example of an operating condition for logical volume.

FIG. 3 is an explanatory diagram showing an operating condition regarding the logical volumes. The logical volume 1110 is discriminated by an operation 1121 as set a volume ID, and includes an operation 1122 indicating a sub-volume, or a secondary volume (S-VOL.) sent from a main-volume, or a primary volume (P-VOL.) 1111, an operation 1123 indicating a main-volume in relation to a sub-volume 1112, an operation 1124 indicating the main-volume in relation to the tape unit 150, an operation 1125 indicating a permanent storage, or a permanent volume setting in relation to the logical volume 1110, an operation 1126 indicating a limited period in relation to the logical volume 1110, and an operation 1127 indicating a time finally accessed to the logical volume 1110.

FIG. 18 is an explanatory diagram showing a relationship between the operating condition in relation to the logical volume and a flag. The setting state of the operation (for example, the operations 1121 to 1127) in relation to the logical volume 1110 is discriminated as a flag. Referring to FIG. 18, when the flag indicates 0, this state is a state (unsetting state) indicating that the operation (operations 1121 to 1127) shown in FIG. 3 is not set. When the flag indicates 1, this state is a state (setting state) indicating that the operation shown in FIG. 3 is set. Further, when the flag indicates 2, this state is a state (release state) indicating that the operation having been set is released.

FIG. 4 is an explanatory diagram showing volume information. Referring to FIG. 4, the volume information 1210 is volume information stored in a table form indicating the volume information (for example, records 121a to 121g) of the logical volume 1110 (referring to FIG. 1) acquired from the storage unit 110 by the volume-information acquiring program 12A0 (referring to FIG. 2). The volume information of the respective volumes indicated by the records 121a to 121g includes a volume ID 1211, a path 1212 indicating a setting state to the logical volume 1110, a copy-roll-1, or a copy-type-1 1213 and a target-1 1214 in a combination indicated by a copy-pair setting state 1, a copy-roll-2 1215 and a target-2 1216 in a combination indicated by a copy-pair setting state 2, a permanent storage setting state 1217, a storage period, or a volume period 1218 of data, a data transfer rate 121X, a volume capacity (size) 121Y, and a final access time 1219.

For example, the record 121a indicates the states in which the sub-volume is set as an operation, the permanent storage is not set (indicated by "0"), and the storage period is not set (indicated by "none"), in relation to a logical volume Vol-1. The record 121c indicates the states in which the main-volume and 10 days as the storage period are set as an operation, in relation to a logical volume Vol-3. Further, in the case of record 121d, it is appreciated that there is not access since a path is not set to the logical volume 1110.

Among the pieces of volume information, there exists a case where the setting state of permanent storage 1217 and the storage period 1218 of data are sometimes not managed. For this reason, a manager of the management server 120 can set a presence or absence of the permanent storage to the logical volume 1110 (referring to FIG. 1) by using the volume-operating setting program 12E0, in this embodiment. Further, the manager can assign the storage period of the logical volume 1110.

FIG. 5 is an explanatory diagram showing operating information. Operating information 1120 of the volumes is operating information regarding such as an operation setting or unsetting in relation to the volumes, that is, the operating information notified between the computer programs (for example, the volume-information acquiring program 12A0, volume-operating notifying program 12B0, and the deletable-volume detecting program 12C0) shown in FIG. 2. Specifically, the operating information 1120 of the volumes is operating information for the logical volume sent over the volume-operating notifying program 12B0 from the volume-information acquiring program 12A0 and over the deletable-volume detecting program 12C0 from the volume-operating notifying program 12B0. The operating information 1120 of the volumes includes a volume ID 112A for discriminating the operated logical volumes, an operation ID 112B for discriminating which the operation is executed among the operations 1122 to 1126 as described in FIG. 3, and an operation classification 112C for discriminating the addition and release of the settings. For example, the operating information 1120 in FIG. 5 indicates that a path is added (set) to the logical volume Vol-1.

FIG. 6 is an explanatory diagram showing an operation map. An operation map 1220 holds a setting aspect of the operation in relation to the logical volumes. When the operation 1126 is added to the logical volume 1110 to be managed by the management server 120 from the operation 1121 shown in FIG. 3, a new operating information record (for example, operating information records 122a to 122f) is registered by the operation-map updating unit 12C1 on the operating addition.

The operating information records include a volume ID 1221 to discriminate the logical volumes as described in FIG. 3 and operating information 1222 to 1226 respectively indicating the unsetting state, setting state and release state of the operations 1122 to 1126. The operating information 1222 to 1226 indicating the addition (setting) and release is all set to the unsetting state (corresponding to 0 in the flag) due to an initiation condition (none-operated condition), by the operation-map updating unit 12C1 on the operating addition, updated to the setting state (corresponding to 1 in the flag) by the operation-map updating unit 12C1 on the operating addition, and updated to the release state (corresponding to 2 in the flag) by the operation-map updating unit 12C2 on the operating release. The volume can be deleted by the operation-map updating unit 12C2 on the operating release when the operations 1122 to 1126 in relation to the logical volume 1110 is all turned into the unsetting state (corresponding to 0 in the flag) or the release state (corresponding to 2 in the flag).

Specifically, in the case of the operating information record 122a, the volume ID is the logical volume Vol-1, the path is set 1 in the flag, and the setting to the main-volume is released as (set "2" in the flag). Further, the sub-volume, permanent storage and storage period are set to the unsetting state as (set "0" in the flag). In the case of the operating information record 122e, it is judged that the volume can be deleted by the deletable-volume detecting program 12C0 since the all operations are set to the unsetting state (corresponding to 0 in the flag) or the release state (corresponding to 2 in the flag).

FIG. 7 is an explanatory diagram showing a deletion list. A deletion list 1230 indicates the logical volume having deletable condition. The deletion list 1230 is constituted by logical volume information (deletable-volume information) containing the volume ID 1231 for discriminating the logical volumes to pair with a priority rule 1232 used for setting the priority of deleting the volumes.

When the operations 1122 to 1126 are all released by the processing of operation-map updating unit 12C2 on the operating release, the deletable-volume information is registered by the processing of deletion-list updating unit 12C4 on the operating release and sent over the volume-deleting program 12D0. Specifically, in the case of FIG. 7, the pieces of deletable-volume information 123a to 123c are registered in the deletion list 1230.

During a time period from when the deletable-volume information 123a to 123c are registered in the deletion list 1230 to when the volume is deleted by the volume-deleting program 12D0, the deletable-volume information of the volume is deleted from the deletion list 1230, when the addition of operations 1122 to 1126 is carried out to the logical volume 1110.

FIG. 8 is an explanatory diagram showing deletion-priority setting information. Deletion-priority setting information 1240 indicates a priority rule to be used for discriminating a priority of deleting the logical volumes registered in the deletion list 1230. The deletion-priority setting information 1240 includes a plurality of priority rules 1241 and a discrimination order 1242 indicating which discrimination by the priority rule is emphasized.

In the case of the example shown in FIG. 8, a priority 124a indicating the copy-pair state of the logical volume registered in the deletion list 1230 is mostly emphasized. Hereinafter, the following priority is emphasized in the order of a priority 124d indicating the final access to the logical volume, a priority 124c indicating the size of the logical volume, and a priority 124b indicating the transfer rate of the logical volume (storage unit). In addition, the final access indicated by a symbol 124d means that the volume is set to a deletable target in the case where the storage period 1218 (FIG. 4) set to every volume from the final access time is elapsed.

Figure 9:
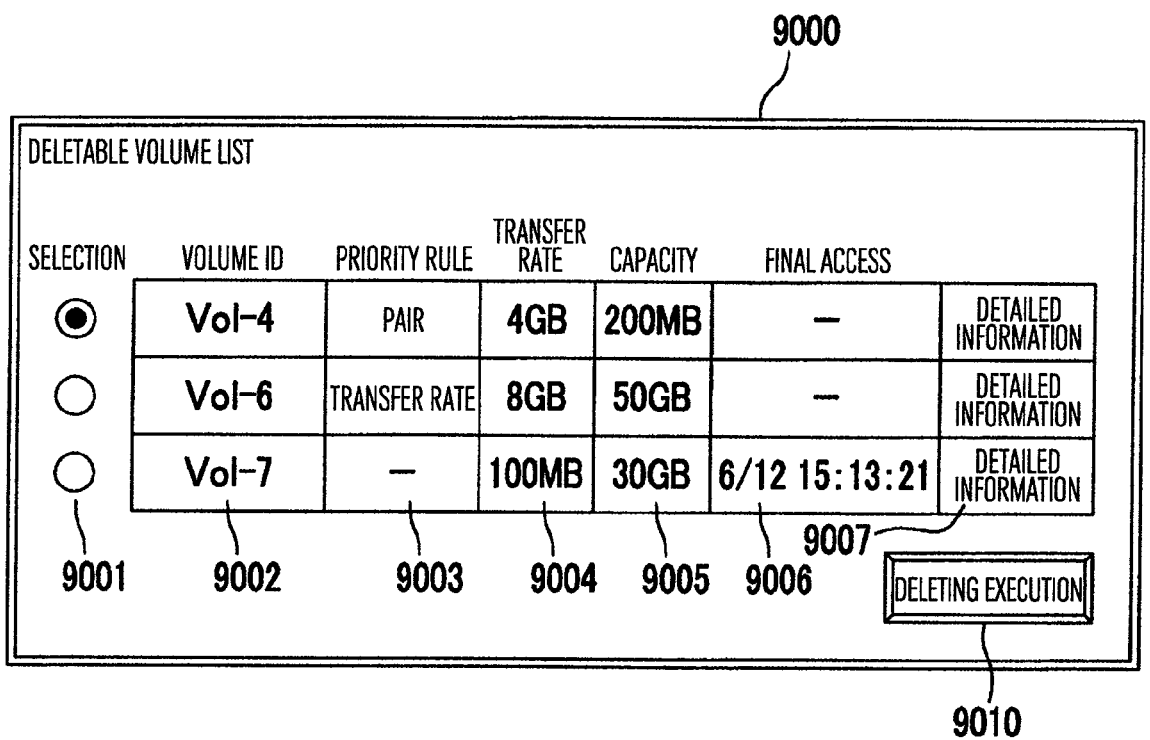
FIG. 9 is a screen showing a list example of the logical volume under a deletable condition.

FIG. 9 is a screen showing an example of logical volume list in which the volume is deletable. A screen 9000 in FIG. 9 displays the list of the logical volumes discriminated as being deletable, by executing the volume-deleting program 12D0 with use of GUI (Graphical User Interface) on the basis of the deletion list 1230 and the volume information 1210.

The deletable volume list as volume information contains a volume ID 9002, a priority rule 9003, a transfer rate 9004, a volume capacity (size) 9005, a final access time 9006, and a detailed information 9007. The volume ID 9002 and priority rule 9003 indicate values of the volume ID 1231 and priority rule 1232 in the deletion list 1230. The transfer rate 9004, volume capacity 9005 and final access time 9006 correspond to the data transfer rate 121X, volume capacity 121Y and final access time 1219, respectively, which displays data on ground of determining the priority order of deletion. Information other than the setting state of path 1212 etc. is displayed by clicking a cell of the detailed information 9007.

A radio button among selection buttons 9001 is selected and a deleting execution button 9010 is pressed to carry out a deletion processing of the logical volume. On the contrary, the GUI as shown in FIG. 9 is unnecessary if the logical volume discriminated as being deletable is deleted unconditionally.

A processing of the main computer program will be described below.

Figure 10:
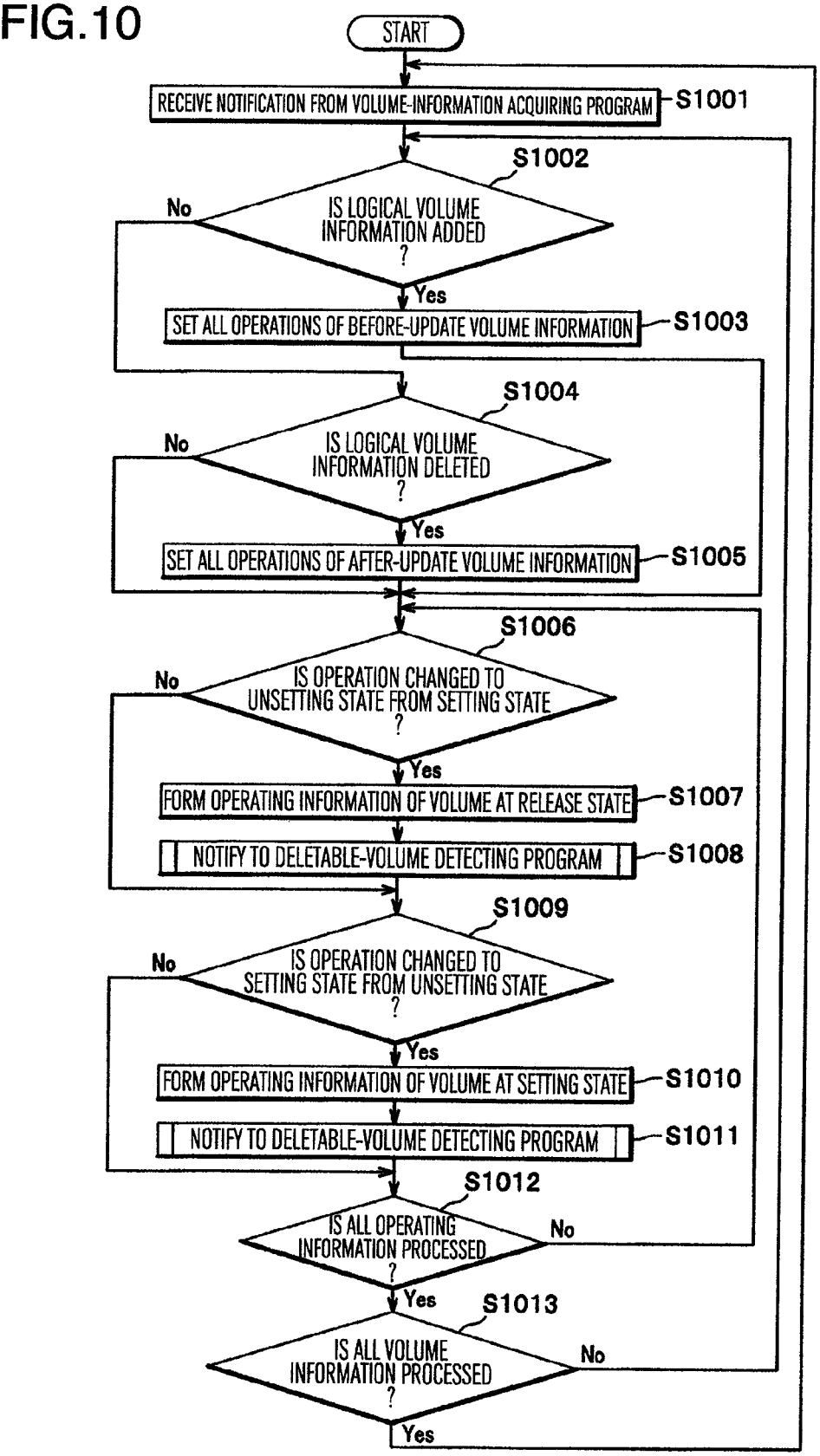
FIG. 10 is a flowchart showing a processing of volume-operating notifying program.

FIG. 10 is a flowchart showing a processing of the volume-operating notifying program. The processing of volume-operating notifying program 12B0 is executed by reading the program 12B0 into the memory 1200 by the CPU 1201.

The volume-operating notifying program 12B0 receives before-update and after-update volume information 1210 from the volume-information acquiring program 12A0, when the volume-operating notifying program 12B0 receives a notification from the volume-information acquiring program 12A0 at a step S1001 to acquire new volume information from the storage unit 110.

The programming step discriminates whether the logical volume information is added at a step S1002. If the logical volume information is added (Yes, at the step S1002), all of the operating information is set to the unsetting state (corresponding to 0 in the flag) at a step S1003 to move the programming step into a step S1006, since the before-update logical volume information is not present. If the logical volume information is not added (No, at the step S1002), the programming step moves into a step S1004.

At the step S1004, the volume-operating notifying program 12B0 discriminates whether the logical volume information is deleted. If the logical volume information is deleted (Yes, at the step S1004), the operating information is all set to the unsetting state (corresponding to 0 in the flag) at a step S1005 to move the programming step into the step S1006, since the after-update logical volume information is not present. If the logical volume information is not deleted (No, at the step S1004), the programming step moves into the step S1006.

At the step S1006, the volume-operating notifying program 12B0, in turn, checks from the setting state of path 1212 to the storage period 1218 contained in the before-update and after-update volume information (referring to FIG. 4) to discriminate whether the operating information is changed to the unsetting state from the setting state. If the operating information is changed to the unsetting state from the setting state (Yes, at the step S1006), the volume information is written into the volume ID 112A, the operating contents are written into the operation ID 112B, and the release state (corresponding to 2 in the flag) is written into the operation classification 112C, in the operating information 1120 of the volume at a step S1007, which is notified to the deletable-volume detecting program 12C0 to call out the program 12C0 at a step S1008 and move the programming step into a step S1009. If the operating information is not changed to the unsetting state from the setting state (No, at the step S1006), the programming step moves into the step S1009.

Specifically, referring to FIG. 4, if the setting state of path 1212 or the setting state of permanent storage 1217 is "1", it is determined that the operation classification is set to the setting state (corresponding to 1 in the flag). Likewise, if the setting state of path 1212 or the setting state of permanent storage 1217 is "0", it is determined that the operation classification is set to the release state (corresponding to 2 in the flag). If the copy-roll-1 1213 is the main-volume, it is determined that the operation ID is the main-volume and the operation classification is the setting state (corresponding to 1 in the flag). If the copy-roll-1 1213 is the sub-volume, it is determined that the operation ID is the sub-volume and the operation classification is the setting state (corresponding to 1 in the flag). If the copy-roll-1 1213 is "none", it is determined that the operation classification is set to the release state (corresponding to 2 in the flag), and the operation ID is set with a before-update copy-roll-1. In the case of the copy-roll-2 1215, the operation ID and operation classification are also set similarly to the copy-roll-1 1213. If the storage period 1218 is present, the operation classification is set to the setting state (corresponding to 1 in the flag), and if the storage period 1218 is "none", the operation classification is set to the release state (corresponding to 2 in the flag).

Referring back to FIG. 10, the volume-operating notifying program 12B0 discriminates whether the operation is changed to the setting state from the unsetting state at the step S1009. If the operating information is changed to the setting state from the unsetting state (Yes, at the step S1009), the volume information is written into the volume ID 112A, the operating contents are written into the operation ID 112B, and the setting state (corresponding to 1 in the flag) is written into the operation classification 112C, in the operating information 1120 (referring to FIG. 5) at a step S1010, which is notified to the deletable-volume detecting program 12C0 at a step S1011 to call out the program 12C0 and move the programming step into a step S1012. If the operating information is not changed to the setting state from the unsetting state (No, at the step 1009), the programming step moves into the step S1012.

At the step 1012, the volume-operating notifying program 12B0 discriminates whether the all operating information contained in the logical volume information is processed by the CPU 1201. If the all operating information contained in the logical volume information is processed (Yes, at the step S1012), the programming step discriminates whether the all volume information is processed at a step S1013. If the all operating information contained in the logical volume information is not processed (No, at the step S1012), the programming step returns to the step S1006. If the all volume information is processed (Yes, at the step S1013), the programming step returns to the step S1001. If the all volume information is not processed (No, at the step S1013), the programming step returns to the step S1002.

A notification example of the operating information 1120 of the volume will be described specifically below.

An example in FIG. 4, if the setting state of permanent storage 1217 in the record 121b is changed to the unsetting state from the setting state, the volume ID 112A in the operating information 1120 (referring to FIG. 5) is set to Vol-2, the operation ID 112B is set to the permanent storage, and the operation classification 112C is set to the release state.

An example in FIG. 4, if the copy-roll-1 1213 in the record 121g is changed to the sub-volume, the volume ID 112A in the operating information 1120 of the volume (referring to FIG. 5) is set to the logical volume Vol-7, the operation ID 112B is set to the sub-volume, and the operation classification 112C is set to addition (setting).

For example, referring to FIG. 4, if the copy-roll-1 1213 in the record 121b is changed to "none", the volume ID 112A in the operating information 1120 (referring to FIG. 5) of the volume is set to the logical volume Vol-3, the operation ID 112B is set to the main-volume, and the operation classification 112C is set to the release state.

Referring also to FIG. 4, if the copy-roll-1 1213 in the record 121f is changed to the main-volume and the copy-roll-2 1215 is changed to the sub-volume, two pieces of the operating information 1120 (referring to FIG. 5) of the volume in which the volume ID 112A is set to the logical volume Vol-6 and the operation classification is set to an addition, are formed. Specifically, in the case of the first operating information 1120 of the volume, the operation ID 112B is added (set) as the main-volume. In the second operating information 1120, the operation ID 112B is added (set) as the sub-volume.

Figure 11:
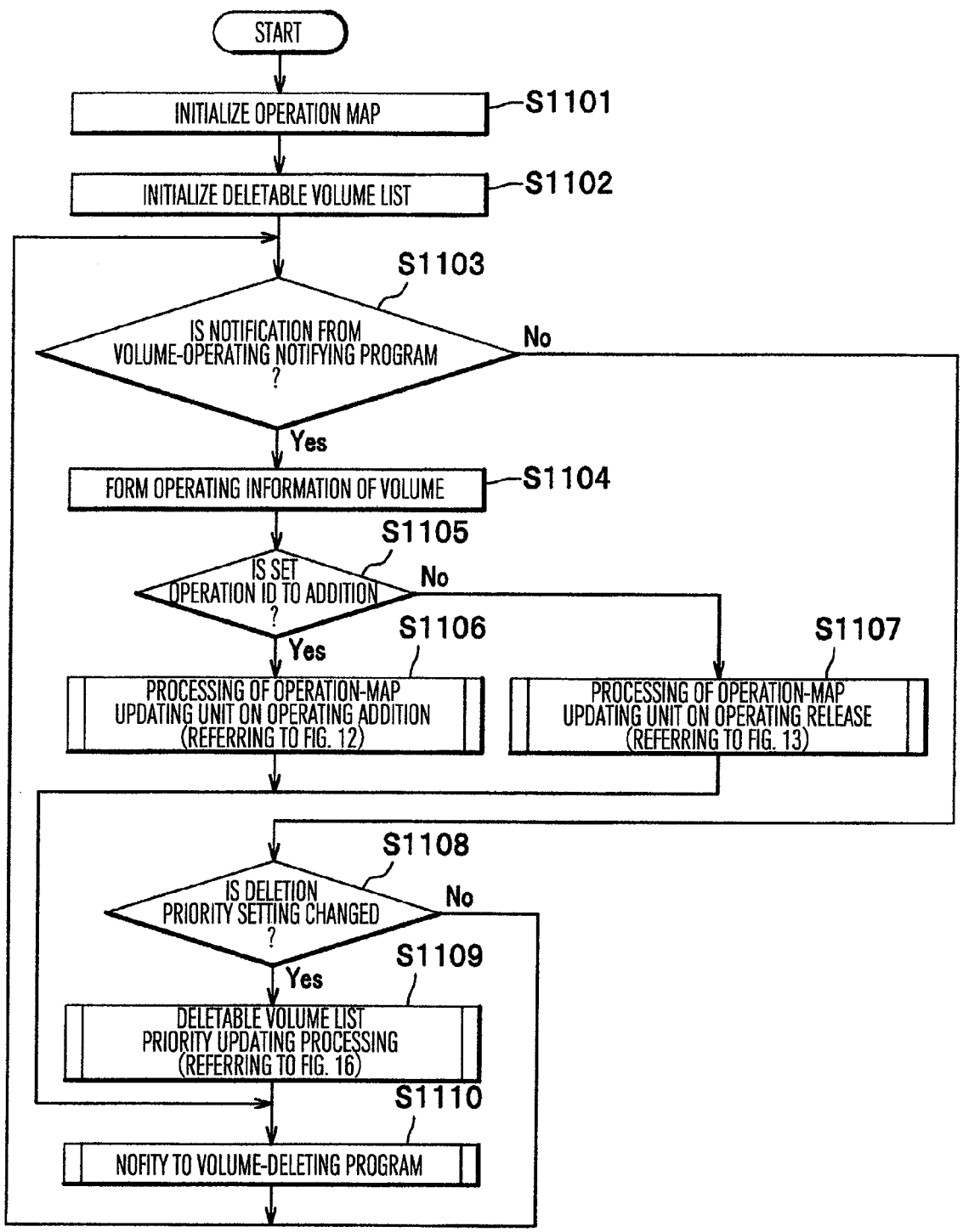
FIG. 11 is a flowchart showing a processing of deletable-volume detecting program.

FIG. 11 is a flow chart showing a processing of a deletable-volume detecting program. The processing of deletable-volume detecting program 12C0 is executed by reading the program 12C0 in the memory 1200 by the CPU 1201.

First, the deletable-volume detecting program 12C0 initializes the operation map 1220 at a step S1101, specifically, deletes all of the registered operating information records 122a to 122e. An initialization is then applied to the deletion list 1230 (referring to FIG. 7) at a step S1102. Specifically, the registered volume IDs 123a to 123c in FIG. 7 are all deleted.

After initializing the deletion list, the programming step stands by a notification which will be entered. The programming step then discriminates whether the notification (notification at the steps S1008, S1011) is of the volume-operating notifying program 12B0 when the notification is entered at a step S1103. If the notification is entered from the volume-operating notifying program 12B0 (if an operation is occurred for the logical volume 1110) (Yes, at the step S1103), the operating information 1120 of the volume (referring to FIG. 5) is formed from the volume ID 112A, the generated operation ID 112B, and the operation classification (classification of the operation setting or release state) 112C at a step S1104.

The operation classification 112C is then discriminated at a step S1105. If the operation classification 112C is the operating addition (Yes, at the step S1105), a processing of the operation-map updating unit 12C1 on the operating addition is called out at a step S1106. If the operation classification 112C is not the operating addition (No, at the step S1105), that is, it is the release state, the operation-map updating unit 12C2 on the operating release is called out at a step S1107. The operating information 1120 of the volume is sent to the operation-map updating unit 12C1, and after updating the deletion list 1230 (referring to FIG. 7), the volume-deleting program 12D0 is called out at a step S1110.

If the notification is not of the volume-operating notifying program 12B0 (No, at the step S1103), for example, if the notification is of an operation change of the deletion-priority setting information 1240 (referring to FIG. 8) from the manager of the management server 120, the programming step moves into a step S1108. If the contents of deletion-priority setting information 1240 are updated (Yes, at the step S1108), a processing (referring to FIG. 16) of deletion-list updating unit 12C5 is executed at a step S1109. The deletion priority order of the logical volumes registered in the deletion list 1230 is changed in response to the updating contents of deletion-priority setting information 1240 by the deletion-list updating process. The programming step then notifies the above change to the volume-deleting program 12D0 at the step S1110, and then returns to the step S1103. If the contents of deletion-priority setting information 1240 is not changed (No, at the step S1108), the programming step returns to the step S1103).

Figure 12:
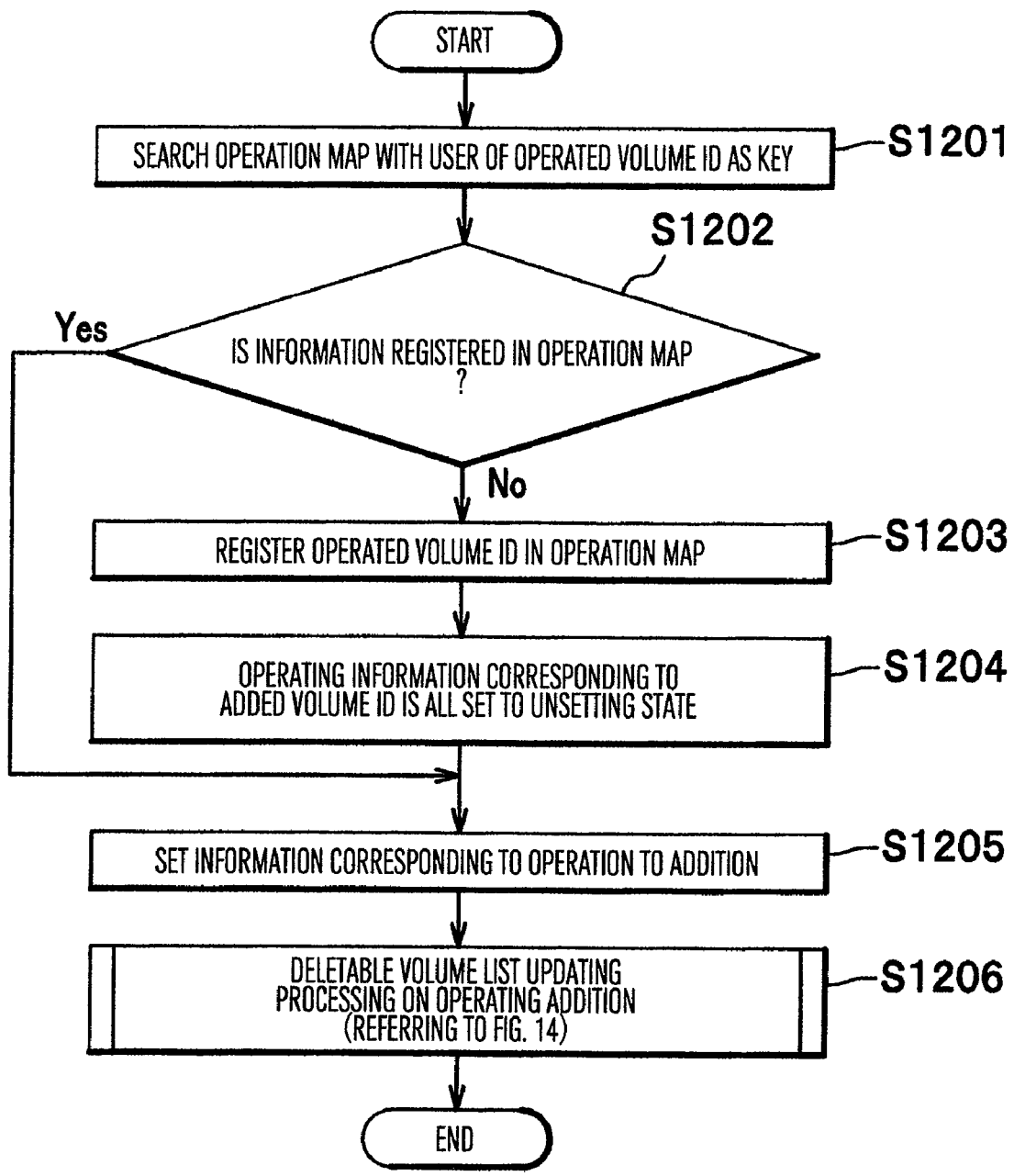
FIG. 12 is a flowchart showing a processing of operation-map updating unit on operating addition.

FIG. 12 is a flowchart showing a processing of an operation-map updating unit on the operating addition. The operation-map updating unit 12C1 on the operating addition is called out from the deletable-volume detecting program 12C0 to send the operating information 1120 of the volume (referring to FIG. 5) to the operating-map updating unit 12C1 when the operating addition is occurred for the logical volume 1110.

The operation-map updating unit 12C1 on the operating addition searches the operation map 1220 with use of the volume ID 112A, as a key, contained in the operating information 1120 of the volume at a step S1201. The programming step discriminates whether information is registered in the operation map 1220 at a step S1202. If the volume ID 1221 matched with the volume ID 112A is not registered in the operation map 1220 (No, at the step 1202), a new operating information record is added to the operation map 1220, and the volume ID 112A is registered in the volume ID 1221 of the added operating information record at a step S1203. The operating information 1222 to 1226 is all set to the unsetting state (corresponding to 0 in the flag) at a step S1204. If the information is registered in the operation map 1220 (Yes, at the step S1202), the programming step moves into a step S1205.

At the step S1205, the operation set in the operation ID 112B, among the operating information 1222 to 1226, is set to the addition or setting state (corresponding to 1 in the flag). For example, under the condition of operation map 1220 in FIG. 6, the storage period 1226 of the operating information record 122d is changed to the setting state (corresponding to 1 in the flag) from the unsetting state (corresponding to 0 in the flag) when the storage period 1226 is set to the logical volume Vol-5.

The deletion-list updating unit 12C3 on the operating addition is then called out to send the operating information 1120 of the volume to the deletion-list updating unit 12C3 at a step S1206.

Figure 13:
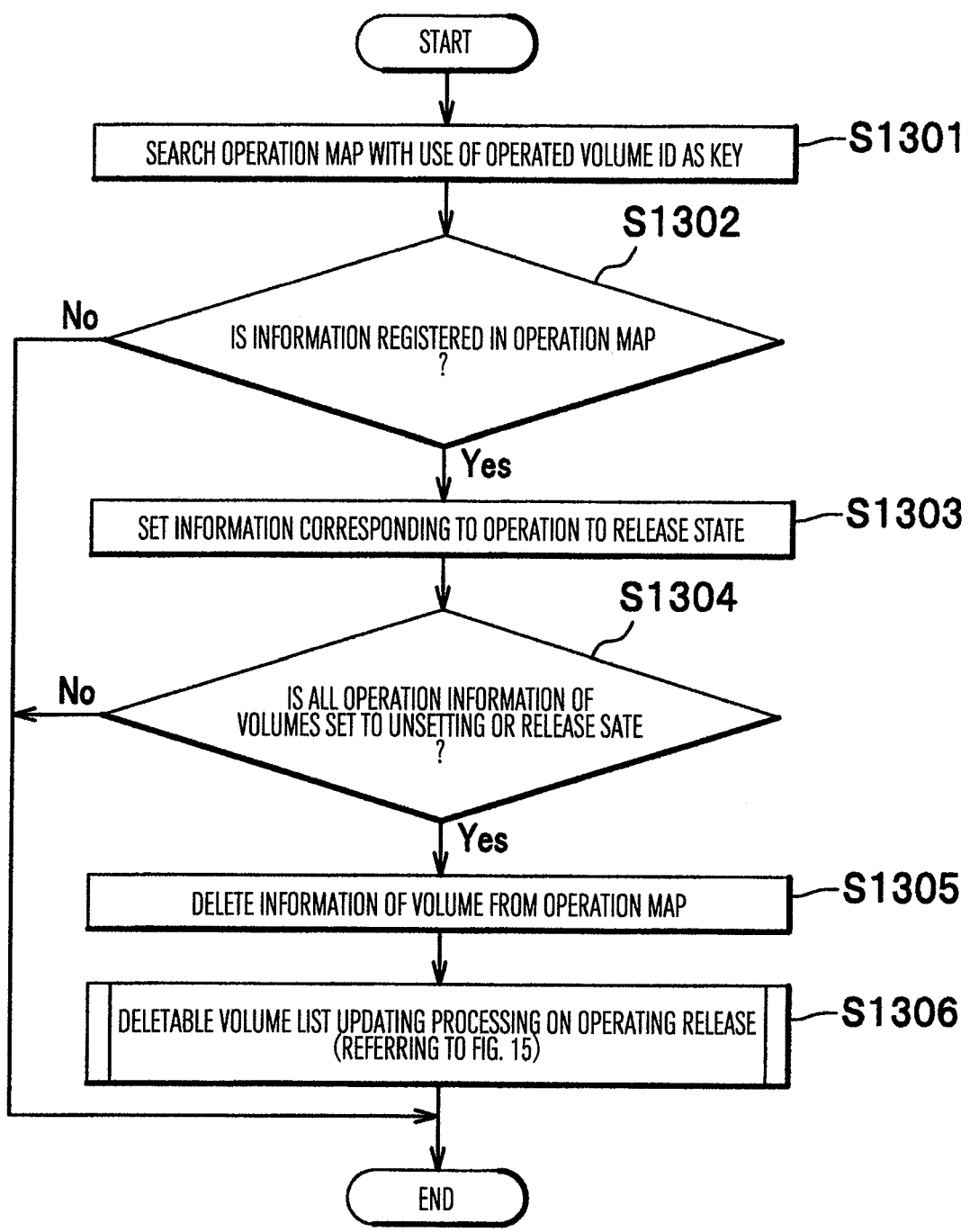
FIG. 13 is a flowchart showing a processing of operation-map updating unit on operating release.

FIG. 13 is a flowchart showing a processing of an operation-map updating unit on operating release. The operation-map updating unit 12C2 on the operating release is called out from the deletable-volume detecting program 12C0 to send the operating information 1120 of the volume to the operation-map updating unit 12C2, when the operating release is occurred for the logical volume 1110.

The programming step searches the operation map 1220 with use of the volume ID 112A, as a key, contained in the operating information 1120 of the volume at a step S1301. The programming step discriminates whether information is registered in the operation map 1220 at a step S1302, and the processing is terminated if the volume ID 1221 matched with the volume ID 112A is not registered in the operation map 1220 (No, at the step S1302).

If the volume ID 1211 matched with the volume ID 112A is registered in the operation map 1220 (Yes, at the step S1302), the operation set in the operation ID 112B is set to the release state (corresponding to 2 in the flag), among the operating information 1222 to 1226, at a step S1303. For example, under the condition of the operation map 1220 in FIG. 6, the permanent storage 1225 of the operating information record 122b is changed to a deletion from an addition when the permanent storage 1225 is released in relation to the logical volume Vol-3.

The programming step discriminates whether all of the operating information (operating information 1222 to 1226) of the volume is set to the unsetting state (corresponding to 0 in the flag) or release state (corresponding to 2 in the flag) at a step S1304. If the operating information is all set to the unsetting or release state (Yes, at the step S1304), the deletion-list updating unit 12C4 on the operating release (the deletion-list updating processing on the operation release) is called out to send the operating information 1120 of the volume at a step S1306 to the deletion-list updating unit 12C4, after deleting the operating information record of the volume from the operation map 1220 at a step S1305. If the operating information is not all set to the unsetting or release state (No, at the step S1304), the processing is terminated.

Figure 14:
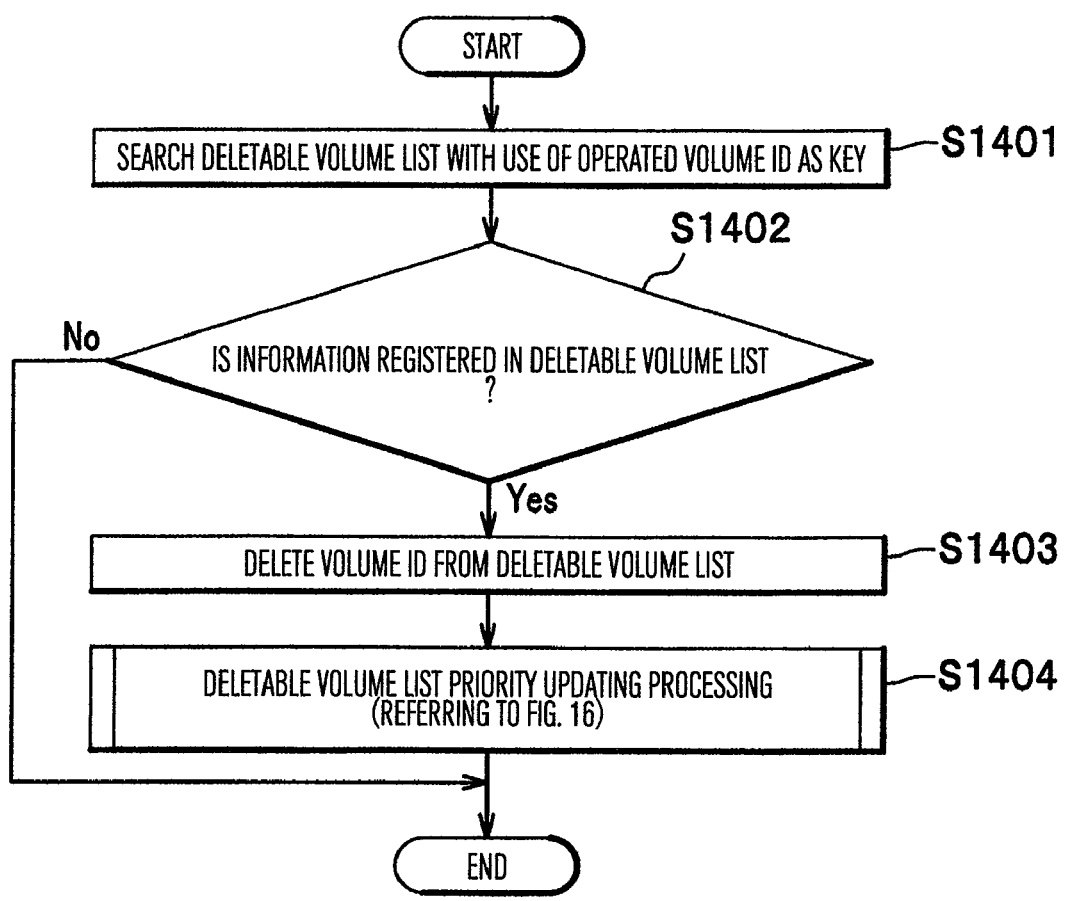
FIG. 14 is a flowchart showing a processing of deletion-list updating unit on operating addition.

FIG. 14 is a flowchart showing a processing of a deletion-list updating unit on operating addition. The deletion-list updating unit 12C3 on the operating addition is called out from the operation-map updating unit 12C1 on the operating addition to send the operating information 1120 of the volume tot eh deletion-list updating unit 12C3, when the operating addition (setting) is occurred for the logical volume 1110. The programming step searches the deletion list 1230 with use of the volume ID 112A, as a key, contained in the operating information 1120 of the volume at a step S1401.

The programming step discriminates whether information matched with the volume ID 112A is registered in the deletion list 1230 at a step S1402. If the information is not registered in the deletion list 1230 (No, at the step S1402), the processing is terminated.

If the information matched with the volume ID 112A is registered in the deletion list 1230 (Yes, at the step S1402), a record containing the volume ID is deleted from the deletion list 1230 at a step S1403.

For example, under the condition where the volume IDs 123a to 123c are registered in the deletion list 1230 in FIG. 7, the record of the volume ID 123c is deleted from the deletion list 1230 when a path is set to the logical volume Vol-7, and the information of the logical volume Vol-7 as the operating information record 122f is registered in the operation map 1220.

After executing the step S1403 (deleting the information from the deletion list 1230), a processing (referring to FIG. 16) of the deletion-list priority updating unit 12C5 is executed at a step S1404. Specifically, the information registered in the deletion list 1230 is sorted in the order of priority, and the processing is then terminated.

Figure 15:
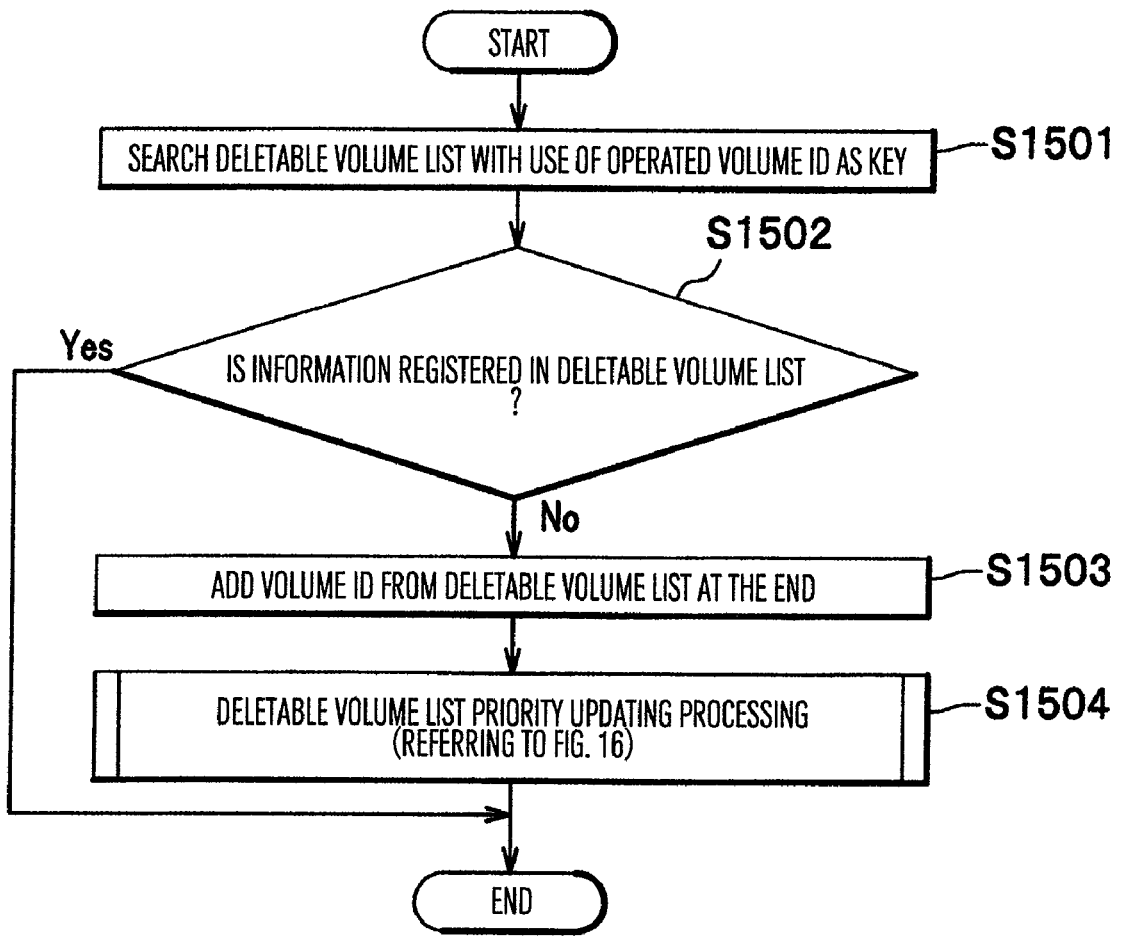
FIG. 15 is a flowchart showing a deletion-list updating unit on operating release.

FIG. 15 is a flow chart showing a processing of a deletion-list updating unit on operating release. The deletion-list updating unit 12C4 on the operating release is called out from the operation-map updating unit 12C2 on the operating release when the operating information is deleted from the operation map 1220 to send the operating information 1220 of the volume to the deletion-list updating unit 12C4.

The programming step searches the deletion-list 1230 with use of the volume ID 112A, as a key, contained in the operating information 1120 of the volume at a step S1501. The programming step discriminates whether information (volume ID) matched with the volume ID 112A is already registered in the deletion list 1230 at a step S1502. If the volume ID matched with the volume ID 112A is already registered in the deletion list 1230 (Yes, at the step S1502), the processing is terminated.

If the volume ID matched with the volume ID 112A is not present in the deletion list 1230 (No, at the step S1502), a record of the volume ID is added to and registered in the deletion list 1230 at the end, at a step S1503. For example, under the condition where the volume IDs 123a and 123b alone are registered in the deletion list 1230 in FIG. 7, the logical volume Vol-7 as the volume ID 123c is registered in the deletion list 1230, when the path of logical volume Vol-7 is released and the operating information record 122f of the operation map 1220 is deleted by the deletable-volume detecting program 12C0.

After executing the step S1503 (in the case where the information is added to the deletion list 1230), the processing (referring to FIG. 16) of deletion-list priority updating unit 12C5 is executed at a step S1504. Specifically, the information registered in the deletion list 1230 is sorted in the order of priority, and the processing is terminated.

Figure 16:
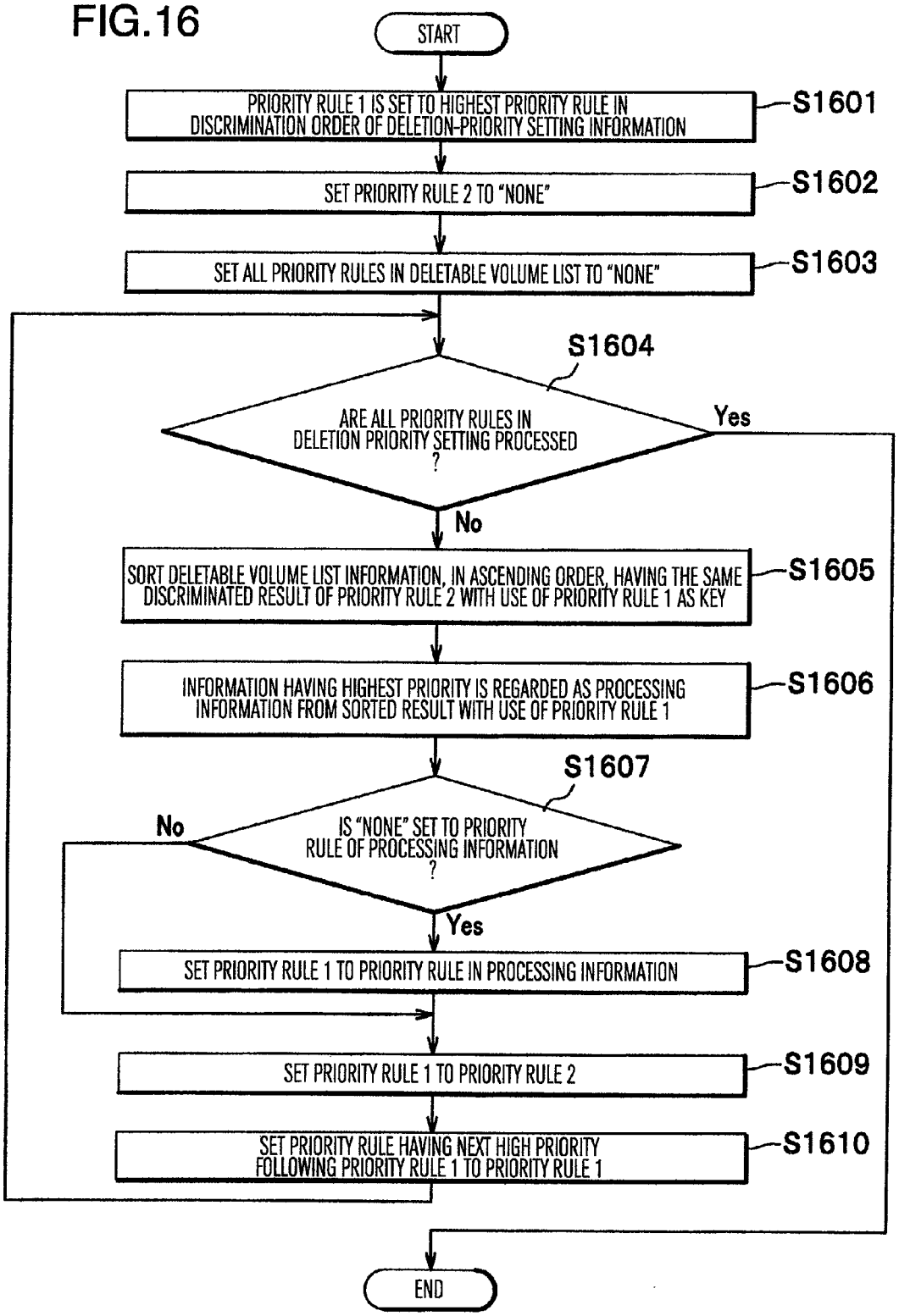
FIG. 16 is a flowchart showing a processing of deletion-list priority updating unit.

FIG. 16 is a flowchart showing a processing of a deletion-list priority updating unit. FIG. 16 shows an example of a processing flow of the deletion-list priority updating unit 12C5 (the steps S1109, S1404, S1504) for the logical volume which is discriminated as being deletable. The deletion-list priority updating unit 12C5 targets a priority rule 1 as a value representing the priority on the processing and a priority rule 2 as a value representing the priority on the previous processing, such that the discrimination order 1242 set in the deletion-priority setting information 1240 (referring to FIG. 8) is processed from the priority rule in the order of ascending priority (a smaller value has a high priority in the example of FIG. 8). At a time of starting the processing, the priority rule 1 is set to the highest priority rule in the discrimination order 1242 set in the deletion-priority setting information 1240, at a step S1601. The priority rule 2 is set to "none" (indicating that the previously processed priority is none) at a step S1602. Prior to starting the discrimination of priority, all of the priority rules set in the deletion list 1230 are set to "none" at a step S1603.

The programming step discriminates whether all of the priority rules in the deletion priority setting are processed at a step S1604. If the all of the priority rules in the deletion priority setting have not been processed (No, at the step S1604), the same information (all information if the priority rule 2 is "none") acquired from a result discriminated by the priority rule 2, among the pieces of information in the deletion list 1230, is sorted in the ascending order (higher priority information is placed on a front of the list) at a step S1605. For a purpose of discriminating the sort, the volume information set in the volume information 1210 (referring to FIG. 4) is used, in which the volume information 1210 corresponds to the volume ID in the deletion list 1230.

Specifically, for example, if the priority rule is "pair", the programming step confirms whether the volume having a relationship between the main-volume and sub-volume is registered in the deletion list 1230. If the main-volume is remained, the deletion priority of the sub-volume is made ascended and that of the main-volume is made descended since there is a possibility to restore the sub-volume information.

Further, for example, if the priority rule is "rate", the deletion priority of the logical volume having a high rate is made ascended by, holding a disk speed of the storage unit 110 in the volume information 1210 in advance. Furthermore, if the priority rule is "size", the deletion priority of the logical volume having a large capacity is made ascended, by holding a disk capacity of the logical volume in the volume information 1210 in advance. Moreover, if the priority rule is "final access", the deletion priority of an old logical volume is made ascended, in which the old logical volume means that the final access 1219 in the volume information 1210 is old.

Among the sorting results (results sorted by the deletion list information in which the discriminated result of the priority rule 2 is the same) in accordance with the priority rule 1, the information having the highest priority is regarded as processing information at a step S1606, the programming step discriminates whether the priority rule in the processing information is set to "none" at a step S1607. If the priority rule in the processing information is set to "none" (Yes, at the step S1607), the priority rule 1 is set to the priority rule in the processing information at a step S1608. The current priority rule 1 is set to the priority rule 2 at a step S1609, when the sorting processing is completed by using the priority rule 1 as a key. The priority rule 1241 having the next highest priority in the discrimination order 1242 following the priority rule 1 is set to the priority rule 1, among the deletion-priority setting information 1240, at a step S1610, and the programming step returns to the step S1604. In addition, if the priority rule in the processing information is not set to "none" (No, at the step S1607), the programming step moves into the step S1609.

If the processing for the all priority rules having been set in the deletion-priority setting information 1240 is completed (Yes, at the step S1604), the processing is terminated. In addition, a sorting procedure of the deletion list 1230 in the flowchart shown in FIG. 16 will be described specifically with reference to FIG. 17.

Figure 17:
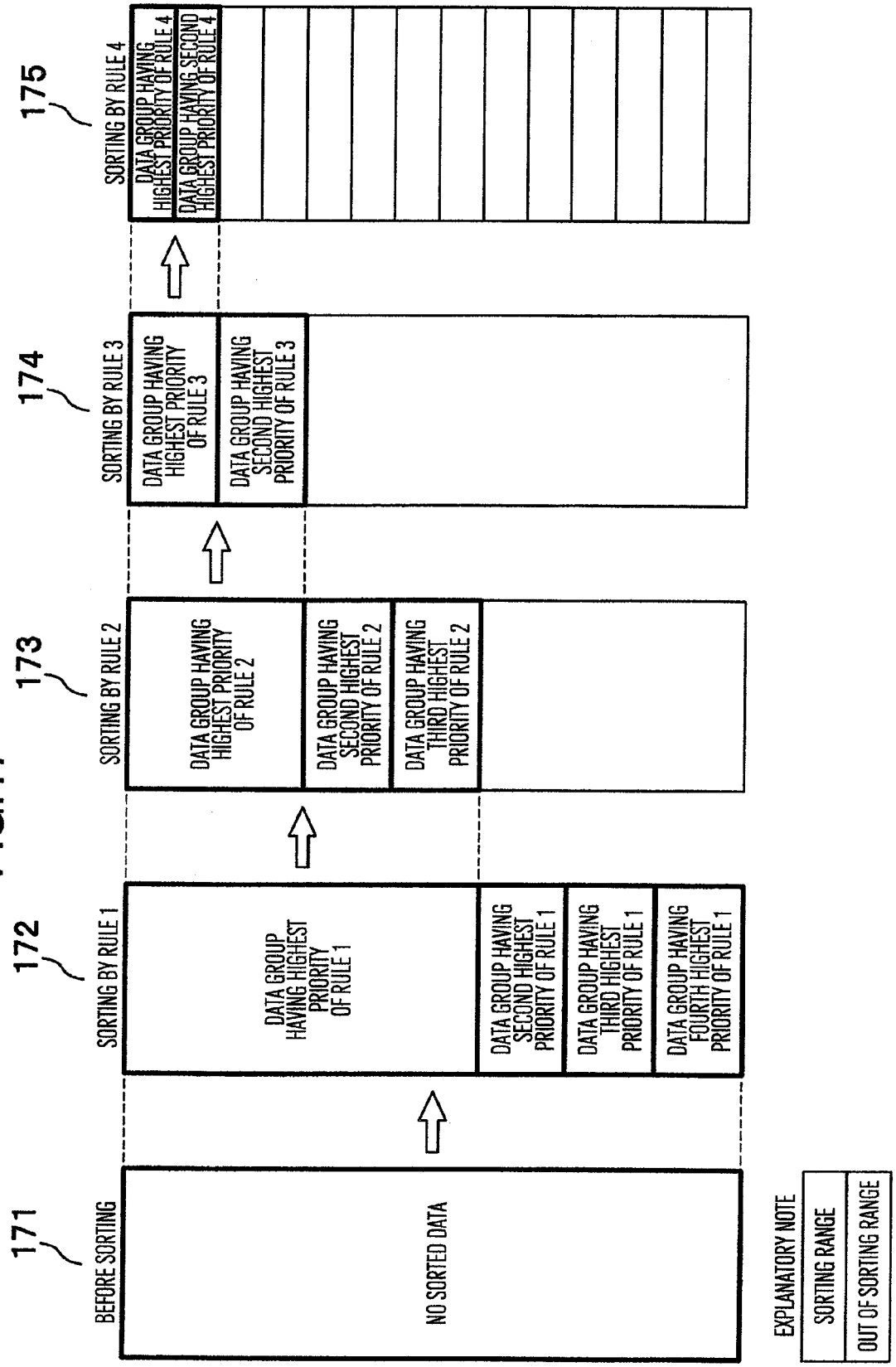
FIG. 17 is an explanatory diagram showing a sorting procedure of the deletion list.

FIG. 17 is an explanatory diagram showing a sorting procedure of the deletion list 1230, and there are four priority rules in the following description. In the case of a before-sorting indicated by a symbol 171, there is data (volume ID group) which is not sorted. At this time, this condition corresponds to all pieces of information when the priority rule 2 is "none."

(1) All pieces of data are sorted by the priority rule 1 (highest priority rule) (referring to a symbol 172).
(2) A sorted result by the priority rule 1 is sorted by the priority rule 2 (second highest priority rule) for every data group having the same priority (referring to a symbol 173).
(3) A sorted result by the priority rule 2 is sorted by a priority rule 3 (third highest priority rule) for every data group having the same priority (referring to a symbol 174).
(4) A sorted result by the priority rule 3 is sorted by a fourth priority rule 4 (fourth highest priority rule) for every data group having the same priority (referring to a symbol 175).

According to the foregoing sorting procedure, the data group in the deletion list 1230 can be sorted.

In addition, the "processing information" in the step S1606 shown in FIG. 16 will be described with reference to FIG. 17. Under the processing of "sorting by rule 3" indicated by the symbol 174, the priority rule 2 is equivalent to the rule 2, and the priority rule 1 is equivalent to the rule 3. That is, the discriminated result of the priority rule 2 at the symbol 173 is the information in the same deletion list, which indicates "data group having highest priority of rule 2", "data group having second highest priority of rule 2", and "data group having third highest priority of rule 2." Therefore, the "processing information" indicates "data group having highest priority of rule 3" among the sorted results by the rule 3 for every data group.

According to the foregoing embodiments, the deletion-list priority updating unit 12C5 carries out to sort the deletion list 1230 on the basis of the priority order (discrimination order) in the deletion-priority setting information 1240. After sorting the deletion list 1230, a first deletion list corresponding to a first priority order (first discrimination order) can also be sorted on the basis of a second priority order (second discrimination order) and the following priority order in the deletion-priority setting information 1240.

According to the foregoing embodiments, the management server 120 manages the operation map 1220 including the volume ID of the volume and plural pieces of the operating information (for example, path setting, main-volume setting, sub-volume setting, permanent storage setting, and storage period setting), as the logical volume to be managed. In the case where an operation is added to the logical volume, corresponding operating information is set to the operating addition. When the operation is release, the operating information is set to the release state. Further, the logical volume corresponding to the volume ID can be detected as being deletable, at a time when given operating information is all released.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system including a host communicatable with a storage unit for providing logical volumes via a SAN (Storage Area Network) and with a management server unit via a LAN (Local Area Network), and for managing operating condition regarding the logical volumes and deletable logical volumes, wherein the management server unit comprises:
    a memory unit that stores operation-map information as a map associated with a volume ID as an identifier of a logical volume with a predetermined operating condition;
    a volume-information acquiring unit that acquires logical volume information on an operating condition of the logical volume from the storage unit to store the logical volume information in the memory unit;
    a volume-operating notifying unit that monitors the operating condition regarding the logical volume in accordance with the logical volume information to notify a changed operating condition as volume operating information; and
    a deletable-volume detecting unit that receives the volume operating information to update the operating condition in the operation map information in accordance with the volume operating information, and that detects the logical volume as being a deletable volume when the volume operating information indicating the predetermined operating condition is all set to a release state, among the notified volume operating information.

2. The system according to claim 1 wherein the memory unit further stores deletion list information as a list of the volume ID of a deletable logical volume, and
    the deletable-volume detecting unit deletes the volume ID of a deletable volume and the volume operating information from the operation-map information, and adds the volume ID of the deletable volume to the deletion list information, when the deletable-volume detecting unit detects that the logical volume is the deletable volume.

3. The system according to claim 2 wherein the deletable-volume detecting unit deletes the volume ID from the deletion list information, when the volume ID of the volume operating information is present in the deletion list information, in a case where the deletable-volume detecting unit receives the volume operating information that is an additional request.

4. The system according to claim 2 wherein the memory unit further stores deletion-priority setting information to set a priority order of the volume operating information, and
    the deletable-volume detecting unit carries out to sort the deletion list information in accordance with the priority order of the deletion-priority setting information.

5. The system according to claim 2 wherein the deletable-volume detecting unit carries out to sort the deletion list information in accordance with a priority order of the deletion-priority setting information, and further carries out to sort first deletion list information corresponding to a first priority order, among the after-sorted deletion list information, in accordance with a priority order lower than a second priority order among the deletion-priority setting information.

6. A method for managing logical volumes with use of a computer system including a host communicatable with a storage unit for providing logical volumes via a SAN (Storage Area Network) and with a management server unit via a LAN (Local Area Network), and for managing an operating condition regarding the logical volumes and deletable logical volumes, the method comprising the steps of:
    storing operation-map information as a map associated with a volume ID as an identifier of a logical volume with a predetermined operating condition;

acquiring logical volume information on an operating condition of the logical volume by the management server unit from the storage unit;

monitoring the operating condition regarding the logical volume in accordance with the logical volume information and notifying a changed operating condition as volume operating information; and receiving the volume operating information to update the operating condition in the operation map information in accordance with the volume operating information, and detecting that the logical volume is a deletable volume when the volume operating information indicating a predetermined operating condition is all set to a release state, among the notified volume operating information.

7. The method according to claim 6 wherein the management server unit provides deletion list information as a list of the volume ID of a deletable logical volume, and the volume ID of a deletable volume and the volume operating information are deleted from the operation-map information, and the volume ID of the deletable volume is added to the deletion list information.

8. The method according to claim 7 wherein the volume ID is deleted from the deletion list information, when the volume ID of the volume operating information is present in the deletion list information, in a case where the volume operating information is an additional request.

9. The method according to claim 7 wherein the management server unit provides deletion-priority setting information to set a priority order of the volume operating information, and the deletion list information is sorted in accordance with a priority order of the deletion-priority setting information.

10. The method according to claim 7 wherein the deletion list information is sorted in accordance with a priority order of the deletion-priority setting information, and first deletion list information corresponding to a first priority order, among the after-sorted deletion list information, is further sorted in accordance with a priority order lower than a second priority order among the deletion-priority setting information.

11. The method according to claim 7, wherein the acquiring step is arranged to be performed at a volume information acquiring section, the monitoring and notifying steps are arranged to be performed at a volume operation notifying section, and the detecting step is arranged to be performed at a deletable volume detection section, the volume information acquiring section, the volume operation notifying section and the deletable volume detection section being arranged to have been provided within the management server unit.

12. The method according to claim 11, wherein the operating condition in the operation-map information is updated by the deletable volume detection section.

13. The method according to claim 11, wherein the volume ID of a deletable volume and the volume operating information are deleted from the operation-map information, and the volume ID of the deletable volume is added to the deletion list information by the deletable volume detection section.

14. The method according to claim 11, wherein the volume ID is deleted from the deletion list information by the deletable volume detection section.

15. The method according to claim 11, wherein the deletion list information is sorted in accordance with a priority order of the deletion-priority setting information by the deletable volume detection section.

16. The method according to claim 11, wherein the deletion list information is sorted in accordance with a priority order of the deletion-priority setting information, and first deletion list information corresponding to a first priority order, among the after-sorted deletion list information, is further sorted in accordance with a priority order lower than a second priority order among the deletion-priority setting information by the deletable volume detection section.

\* \* \* \* \*